United States Patent
Kevin (10) Patent No.: US 8,886,684 B2
(45) Date of Patent: Nov. 11, 2014

(54) APPARATUS AND METHOD FOR MANAGING REGISTER OF UNIQUE IDENTIFIERS

(75) Inventor: Loughrey Kevin, Gymea Bay (AU)

(73) Assignee: DPiO Pty Ltd, Gymea Bay (AU)

( * ) Notice: Subject to any disclaimer, the term of this patent is extended or adjusted under 35 U.S.C. 154(b) by 93 days.

(21) Appl. No.: 13/383,839

(22) PCT Filed: Jul. 14, 2010

(86) PCT No.: PCT/AU2010/000896
§ 371 (c)(1),
(2), (4) Date: Jan. 13, 2012

(87) PCT Pub. No.: WO2011/006201
PCT Pub. Date: Jan. 20, 2011

(65) Prior Publication Data
US 2012/0117119 A1      May 10, 2012

(51) Int. Cl.
*G06F 17/30* (2006.01)
*G06K 7/14* (2006.01)
*G06Q 10/00* (2012.01)
*G06F 21/00* (2013.01)
*H04L 9/08* (2006.01)

(52) U.S. Cl.
CPC *G06Q 10/00* (2013.01); *G06K 7/14* (2013.01); *G06F 21/00* (2013.01); *H04L 9/08* (2013.01)
USPC .............. 707/803; 705/50; 235/419; 235/494

(58) Field of Classification Search
USPC .............. 707/790, 803; 705/50; 235/419, 494
See application file for complete search history.

(56) References Cited

U.S. PATENT DOCUMENTS

| | | | | |
|---|---|---|---|---|
| 5,298,731 | A * | 3/1994 | Ett | 235/462.02 |
| 5,343,028 | A * | 8/1994 | Figarella et al. | 235/462.09 |
| 5,481,103 | A * | 1/1996 | Wang | 235/494 |
| 5,939,700 | A * | 8/1999 | Ackley | 235/462.01 |
| 8,311,043 | B2 * | 11/2012 | Goryavsky | 370/395.3 |
| 2003/0062422 | A1 | 4/2003 | Fateley et al. | 235/494 |
| 2004/0022444 | A1* | 2/2004 | Rhoads | 382/232 |
| 2004/0068470 | A1* | 4/2004 | Klyne | 705/50 |
| 2005/0173524 | A1* | 8/2005 | Schrader | 235/384 |
| 2005/0251538 | A1* | 11/2005 | Cooke et al. | 707/200 |
| 2006/0113390 | A1* | 6/2006 | Muramatsu | 235/462.27 |
| 2007/0074024 | A1* | 3/2007 | Cheong et al. | 713/171 |
| 2007/0083491 | A1* | 4/2007 | Walmsley et al. | 707/3 |

(Continued)

OTHER PUBLICATIONS

ID Automation; http://www.idautomation.com/barcode-faq/isbn/ ;Sep. 6, 2009.*

(Continued)

*Primary Examiner* — Dennis Truong
(74) *Attorney, Agent, or Firm* — Molins & Co Pty Ltd (57) ABSTRACT

A method for allocating a first range of identifiers to a customer-system from a register. The method comprising the steps of: receiving a request for identifiers from a new customer-system; identifying a largest range of unallocated identifiers to define an available range within the entire range of identifiers belonging to the register; identifying a midpoint in the largest available range; and allocate the identified midpoint as a start location for the customer-system range. Identifiers can be issued as identifier pairs, one being an encrypted identifier and the other being a corresponding unencrypted identifier.

16 Claims, 7 Drawing Sheets

(56) References Cited

U.S. PATENT DOCUMENTS

| | | | | |
|---|---|---|---|---|
| 2007/0233823 | A1* | 10/2007 | Traub et al. | 709/220 |
| 2008/0082628 | A1* | 4/2008 | Rowstron et al. | 709/217 |
| 2008/0130896 | A1* | 6/2008 | Wernet et al. | 380/277 |
| 2010/0086235 | A1* | 4/2010 | Loughrey et al. | 382/312 |
| 2010/0109903 | A1* | 5/2010 | Carrick | 340/825.49 |
| 2010/0306318 | A1* | 12/2010 | Fitzpatrick et al. | 709/206 |
| 2011/0264706 | A1* | 10/2011 | Simon | 707/803 |
| 2012/0322380 | A1* | 12/2012 | Nannarone et al. | 455/41.2 |
| 2013/0153657 | A1* | 6/2013 | Loughrey et al. | 235/437 |

OTHER PUBLICATIONS

World data; http://www.barcodehq.com/primer.html; Feb. 1, 2001.*

GSI; http://www.gs1.org/barcodes/implementation ; Feb. 17, 2006.*

Kalid Azad; "The Quick Guide to GUIDs";http://betterexplained.com/articles/the-quick-guide-to-guids/; Apr. 18, 2007.*

Dr. Heiner Lehr; "Unique identification"; http://www.unescap.org/sites/default/files/7-%20Unique%20identification-Heiner.pdf; Sep. 8, 2010.*

The Regents of the University of California;"VLAN Identification Number Assignments"; http://www.oit.ucsb.edu/committees/CNC-BEG/vlan_id.asp; Feb. 1, 2001.*

CAS; "CAS Registry and CAS"; http://www.cas.org/content/chemical-substances/faqs#q4; Feb. 1, 2002.*

Red Hat; "Assigning and Managing Unique Numeric Attribute Values"; https://access.redhat.com/documentation/en-US/Red_Hat_Directory_Server/9.0/html/Administration_Guide/dna.html; Aug. 18, 2010.*

Carolyn Puckett;Social Security Bulletin,http://www.ssa.gov/policy/docs/ssb/v69n2/v69n2p55.html; vol. 69 No. 2, 2009.*

Oracle; "JavaTM 2 Platform Standard Ed. 5.0"; http://docs.oracle.com/javase/1.5.0/docs/api/java/util/UUID.html; Apr. 4, 2004.*

* cited by examiner

APPARATUS AND METHOD FOR MANAGING REGISTER OF UNIQUE IDENTIFIERS

FIELD OF THE INVENTION

The present invention relates to identifiers and in particular to an apparatus and method for managing unique identifiers.

The invention has been developed primarily for use as an apparatus for managing a register of unique identifiers and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known devices for managing unique identifiers include systems that allocate consecutive ranges of unique identifiers to customers on a first come first served basis. It will be appreciated that if the initial range of unique identifiers offered to a customer is too large, significant portions of the register of unique identifiers can remain unused. However, if the initial range of unique identifiers offered to a customer is too few, an additional range offered to a customer upon a subsequent request is unlikely to include consecutive unique identifiers.

There is a need in the art for a system and method that can manage/allocate ranges of unique identifiers from a register, which offers a more efficient exploitation of the register while enabling consecutive ranges of unique identifiers to be allocated to an existing customer upon a subsequent request.

OBJECT OF THE INVENTION

It is an object of the present invention to overcome or ameliorate at least one of the disadvantages of the prior art, or to provide a useful alternative.

It is an object of the invention in its preferred form to provide an improved apparatus for managing unique identifiers.

SUMMARY OF THE INVENTION

According to a further aspect of the invention there is provided a method for allocating a first range of identifiers to a customer-system from a register, the method comprising the steps of:
  (a) receiving a request for identifiers from a new customer-system;
  (b) identifying a largest range of unallocated identifiers to define an available range within the entire range of identifiers belonging to the register;
  (c) identifying a midpoint in the largest available range; and
  (d) allocating the identified midpoint as a start location for the customer-system range.

Preferably, identifiers in the allocated range are each encrypted, and identifier pairs comprising the allocated identifier and corresponding encrypted identifier are transmitted to the customer-system Preferably, a second range of identifiers allocated to a subsequent customer-system request is selected from substantially the midpoint of available identifiers defining a largest domain space distance. More preferably, the allocated range is selected from available identifiers defining a largest domain space distance. Most preferably, the domain space distance is defined as being the magnitude of the quantity of individual identifiers between: the beginning of the entire range of identifiers to the beginning of the first allocation of identifiers to a previous customer-system; or the end of a previous customer-system allocation to the beginning of another previous customer-system; or the end of a previous customer-system allocation to the end of the entire range of available identifiers.

Preferably, a second range of identifiers is allocated to the customer-system, the customer-system being previously allocated identifiers from the register, the method comprising of the steps of:
  (e) receiving a request for additional identifiers from an existing customer-system;
  (f) locating the end-point for that client's previously allocated customer-system range;
  (g) checking availability of sufficient unallocated additional identifiers that are contiguous (or serially-sequential) from the located end-point of the client's previously allocated customer-system range; and
  (h) adding a record to a relevant database for maintaining a register of each allocated range.

According to an aspect of the invention there is provided an apparatus for managing unique identifiers comprising a processor coupled to a database, via a data network. One or more customers and can access the processor for allocating a range of unique identifiers. The processor is adapted to allocate one or more ranges of unique identifiers (or numbers) from a registry. The customer preferably owns and/or operates one or more systems that utilise an allocation of numbers. These systems are preferably comprised of various software applications and physical processes people or machines must carry out to produce a product or effect or to deliver a particular service. Preferably, each system is taken to need a different allocation of unique identifies. This allocation of unique identifiers is, by way of example only, illustrated by calling each request for a block of numbers as having been generated to satisfy the needs of a "customer-system". A customer-system is preferably allocated a range/block of identifiers/numbers and becomes the registered owner of that range/block of identifies.

Preferably, the allocated range is selected from available identifiers defining the largest "domain space distance". The "domain space distance" is preferably defined as being the magnitude of the quantity of individual identifiers between:
  a) the beginning of the entire range of identifiers to the beginning of the first allocation of identifiers to a previous customer-system; or
  b) the end of a previous customer-system allocation to the beginning of another previous customer-system; or
  c) the end of a previous customer-system allocation to the end of the entire range of available identifiers.

More preferably the beginning of the allocated range, for the next allocation to a new customer-system, is selected from substantially the midpoint of available identifiers defining the largest extant "domain space distance".

According to an aspect of the invention there is provided a database comprised of one or more tables for maintaining a register.

According to an aspect of the invention there is provided a method for allocating a first range of identifiers to a customer-system from a register, the method comprising:
  a) receiving a request for identifiers from a new customer-system;

b) identifying a largest range of unallocated numbers (the "available range") within the entire range of numbers belonging to the register;
c) identifying a midpoint in the largest available range; and
d) allocate the identified midpoint as a start location for the customer-system range.

Preferably, to allocate an additional range of identifiers to an existing customer-system that has previously been allocated numbers from the register, the method is comprised of the following steps:
a) receiving a request for additional identifiers from an existing customer-system;
b) locating the end-point for that client's previously allocated customer-system range;
c) checking availability of sufficient unallocated additional identifiers that are contiguous (or serially-sequential) from the located end-point of the client's previously allocated customer-system range; and
d) adding a record to the relevant database table recording the customer-system ID, the date-time of issue, the start number and the end number.

According to an aspect of the invention there is provided on the server an algorithmic process that encrypts all numbers allocated. When numbers are issued to a client system each unique number is issued in a pair; one being the number unencrypted, the other being the encrypted number. There is also provided to client-systems an apparatus for decoding an encrypted unique identifier, the apparatus including an input device adapted to receive data indicative of a mark (comprising a unique identifier); a processor adapted to receive and decode the data to provide an associated unique identifier; the processor coupled to a database and adapted to interrogate the database to receive relevant information.

Preferably the processor further authenticates and decrypts the data to provide an associated unique identifier.

According to an aspect of the invention there is provided a method for decoding a unique identifier, the method comprising the steps of:
a) receiving and decoding an identifier marking to provide an extracted code;
b) decrypting the extracted code to provide a composite code;
c) authenticating the composite code;
d) extracting a unique identifier from the composite code; and
e) interrogating a database to provide an entry associated with the unique identifier.

According to a further aspect of the invention there is provided a computer program product for implementing a method for allocating a range of identifiers to a customer-system.

According to a further aspect of the invention there is provided computer-readable carrier medium carrying a set of instructions that when executed by one or more processors cause the one or more processors to carry out a method for allocating a range of identifiers to a customer.

According to a further aspect of the invention there is provided a computer program product for implementing a method for decoding a unique identifier.

According to a further aspect of the invention there is provided computer-readable carrier medium carrying a set of instructions that when executed by one or more processors cause the one or more processors to carry out a method for decoding a unique identifier.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

It will be appreciated that embodiments can enable a global system of individual identification. As the world's economy becomes more globalised, there is a need for a system of identification that is also global, which has the ability to generically or uniquely identify items. Preferably, a single registry of numbers is maintained, from which ranges of unique identifiers can be allocated on a customer-system by customer-system basis. Each customer may own/operate their own administrative or operational systems in which these identifiers are used. An embodiment can operate solely within the particular company's organisation or the company may wish to share this system utilising this method of identification with a limited group of organisations (or the general public).

The registry can provide a sufficiently large range of identifiers (or numbers) from which sub-ranges can be exclusively allocated on a customer-system basis. By way of example only, the registry can support, say, 128 bit identifiers (96 bits are available for unique identification, while the remaining 32 bits are used for communications and systems administration. It will be appreciated that a 96 bit identifier provides 79,228,162,514,264,337,593,543,950,336 unique numbers. It should be noted that, by using an identifier with more bits, a greater range of numbers can be supported. Preferably, the identifiers/numbers that are available to the registry are:
a. apportioned efficiently;
b. substantially satisfy the needs of the customer-systems that are allocated the identifiers, particularly that subsequent allocations to that customer-system provide identifiers sequential to previous allocations; and
c. involve little administration, both by a customer and a registry organisation.

In maintaining the register it is preferred that:
identifiers are not allocated to customers and not used or wasted,
administration of the registry is not onerous,
a subsequent allocation to a customer-system is contiguous from previous allocations, and
access to allocating identifiers is restricted; thereby warranting uniqueness of allocated identifiers.

The existence of a single registry, for issuing unique identifiers, can assist all to participate in world trade and financial commerce. This in turn can assist in raising the productivity of developing nations.

Figure 1:
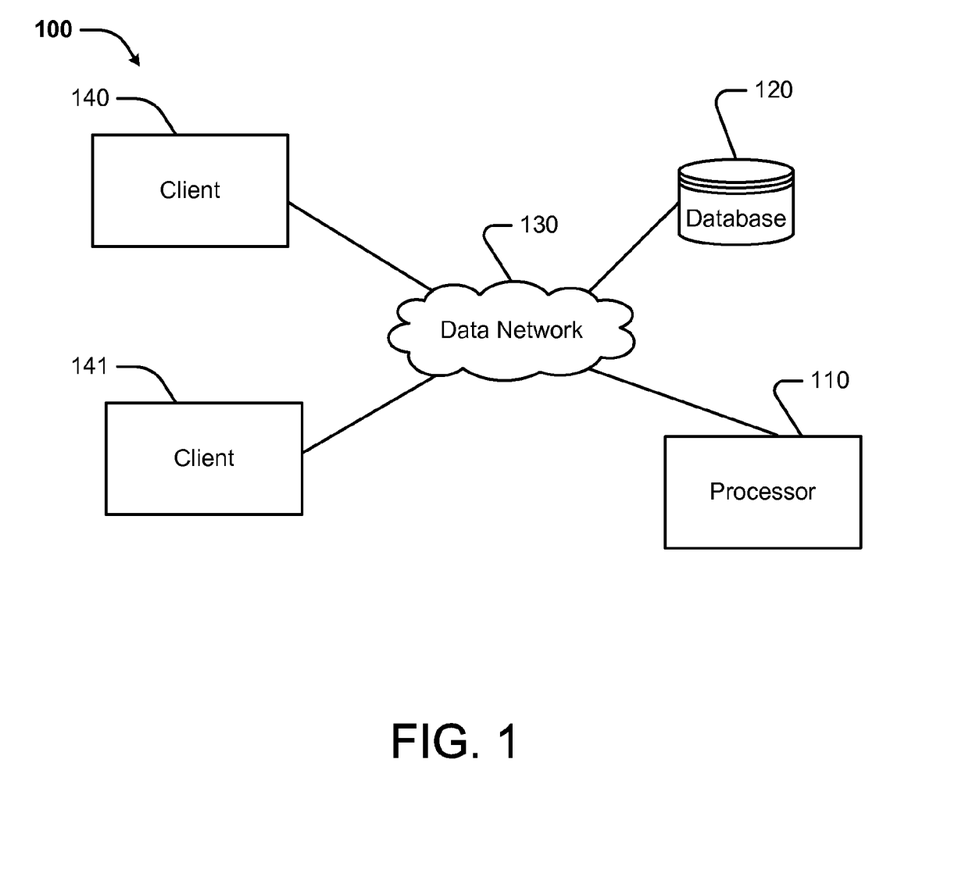
FIG. 1 is a schematic representation of an apparatus for managing unique identifiers.

FIG. 1 shows an embodiment of an apparatus 100 adapted to allocate one or more ranges of unique identifiers (or numbers) from a registry. The apparatus includes a processor 110 coupled to a database 120, via a data network 130. One or more customers 140 and 141 can access the processor for allocating a range of unique identifiers. The customer/entity is allocated range/block of identifiers/numbers and becomes the registered owner.

By way of example only, the potential commercial value of the registry can be identified based on the following business model. This can further enhance the value of an advanced AutoID system to manufacturers, retailers and consumers. The use of barcodes in supermarkets can significantly improve the productivity of check-outs at a point of sale. Labour savings for the supermarket can also improve consumer satisfaction, and can further increase the chance of return sales.

Preferably there must be established a number of standards, which all vendors and providers of tag readers and product numbering systems will adhere. One of these is the numbering system that uses a barcode to represent (or be indicative of) an identifier.

Linear barcode systems, typically utilised in supermarkets, are the product of an era from when computing power, particularly the capacity of computers to store very large quantities of numbers and process them in close to real-time, was not commonly available or cost-affordable. These practical limitations have resulted in the modest objectives of the linear barcode system.

Generic identification typically identifies an item as being of a certain type (for example a size 10 shoe of a particular make and model), whereas individual identification typically identifies each item specifically, (for example a specific shoe manufactured, wholesaled or retailed). With advances in computing technology, combined with a significant decrease in the cost, it is feasible to implement systems that can individually identify items.

Using individual identification, it would be possible for a retailer to identify the item being sold, and also retrieve all manner of data relating to an item (for example the date-time it was manufactured, ordered, received, placed on the shelves and sold to a consumer). This visibility of inventory could greatly improve the ability of a retailer to detect fraud with respect to such things as product quality and warranty, and could also facilitate such actions as product recalls. Preferably an individual identification labelling system, utilising a unique identifier, can offer a low cost, implementable system of uniquely identifying items involved in commercial and financial transactions.

It would be appreciated that, preferably, all entities in a supply chain should use the same identification system; utilising a single registry of numbers from which all customers in finance and commerce draw their unique identifiers/numbers. The registrar providing this service of issuing identifiers/numbers to customers, for their sole use, could charge for this service. Preferably the identifiers are issued as a range (or block of numbers) that are guaranteed to be unique across all customers.

It will be appreciated that recording a large number of unique identifiers/numbers and, to issue a unique range to a particular customer-system, a record indicative of every issued identifier (and the customer-system to whom it was issued), requires substantial computer storage capacity.

Recording the allocation of unique identifiers from an identifier domain that is large (for example in the order of $2^{128}$) requires significant computer storage capacity. It is preferable instead that there be only a recording of a summary of the allocated identifiers issued to a customer-system. For example, recording the allocation of unique identifiers can include the "begin" number and the "end" number of a sequentially allocated block of numbers.

In this example, it is preferable that customer-system be allocated identifiers that are serially-sequential, and more preferable that additional identifiers, subsequently allocated to a customer-system, are serially-sequential, commencing from an earlier allocation. These identifiers can be used by a customer-system within a system they own or manage.

It will be appreciated that a customer-system typically does not know the number of unique numbers that will be required over the life of the system. However it is preferable that all identifiers issued to a customer (both initially and subsequently) are contiguous for any particular system. Managing identifiers that are not contiguous for a particular system can impose an unacceptable administrative impost on the customer.

A method and apparatus for allocation could be achieved wherein the numbers allocated to a "customer-system" were contiguous (or serially-sequential) is described by way of example. The recording of the unique numbers, allocated for each customer, can be summarised and achieved through the use of a database consisting of three relational tables.

An "Open" or "Closed" system is typically recognized, by way of example, as follows:

a "Closed System" typically does not share its information with external entities. The system belongs to a particular firm (or group of firms), but is generally not open for use by the public. For example, a closed system includes an inventory management system of furniture in offices owned by a particular company. Each item of furniture is given a unique ID by the owner of the furniture, which may be traced back to a database providing more details about that item of furniture; including, for example, the purchase order on which it was obtained, the date of delivery, the date and means of payment, etc.

an "Open System" typically interoperates with a number of other entities. In such a situation there is a central server (and database) that is used to interpret tags belonging to each entity, and provide a method for interpreting tag's information. With these examples of a closed system for managing/auditing office furniture, another tag may be allocated by a central industry body, and applied to the furniture, that provides details on the furniture from an industry standards database. In that example, the reader of a mark could interrogate a pre-designated server (or database) that is external to the firm for obtaining further details (or referred to another Universal Resource Locator (URL)) indicative of the item.

Figure 2A:
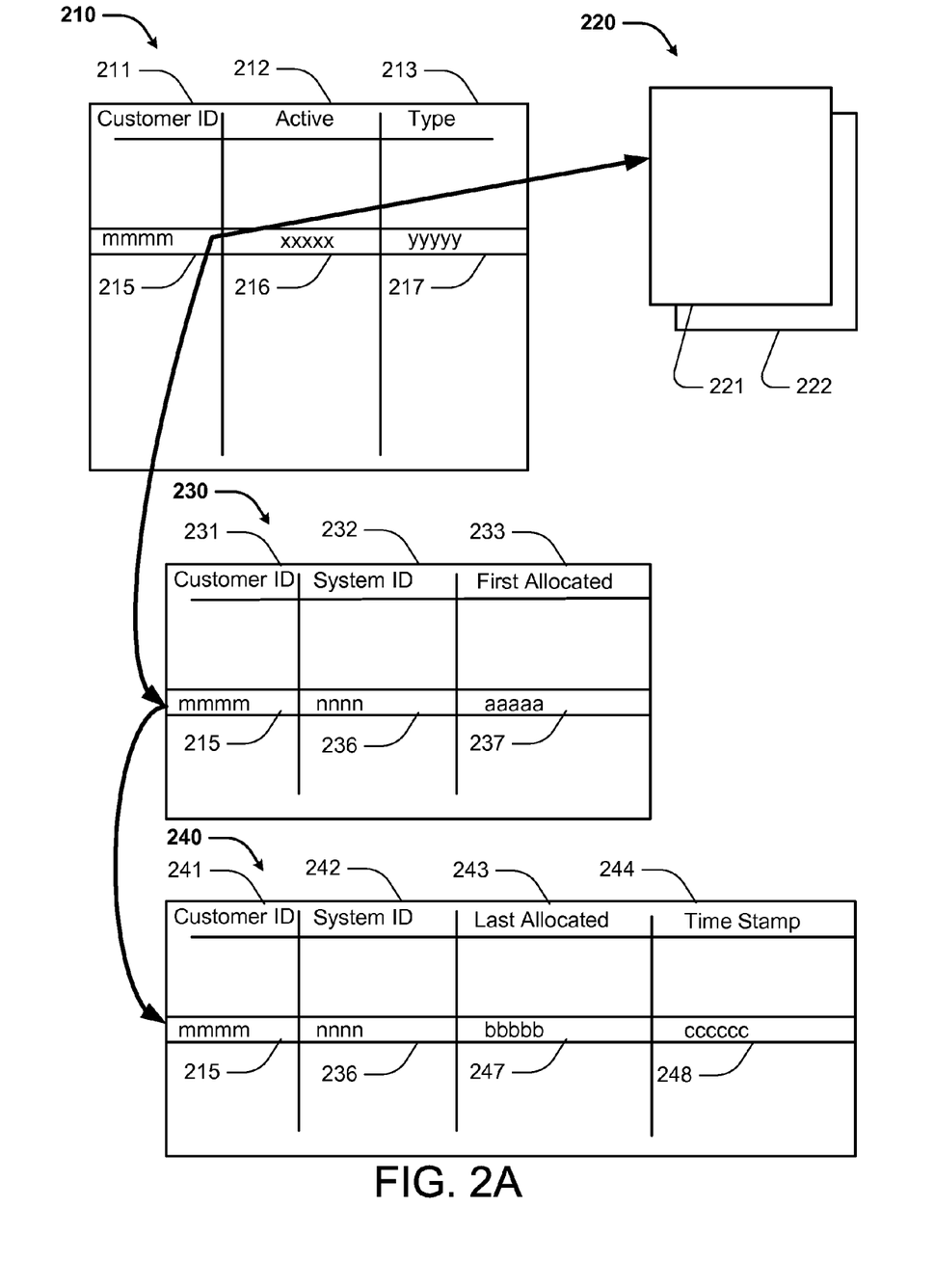
FIG. 2A is a schematic representation of a database structure for managing unique identifiers.

Referring to FIG. 2A, an example database can maintain the register using three relational tables 210, 230, and 240, as described below.

a. First Table 210:
  (1) Customer ID 211
    (8 bytes—range of 18,446,744,073,709,551,616 customers);
  (2) Customer Active 212 (Boolean—1 bit); and
  (3) Customer Type ID 213 (1 byte).
  It will be appreciated that details relating to Addresses, Phones, Notes, Contacts, can be stored in other tables 220 (for example 221 and 222), and have as a key the Customer ID).

b. Second Table 230:
  (1) Customer ID 231
    (8 bytes—range of 18,446,744,073,709,551,616 customers);
  (2) System ID 232 (4 bytes—a range of 4,294,967,296 systems); and
  (3) First Number Allocated 233 (16 bytes).
c. Third Table 240:
  (1) Foreign Key made up of Customer ID 241 and System ID 242 (12 bytes)
  (2) Last Number Allocated 243 (16 bytes); and
  (3) Date Time Allocated 244 (8 bytes—584 million years in 1/1,000th second intervals)

In this example registry, allocating a first range of identifiers to a customer involves the steps of:
  a) adding an entry in the first table 210 to specify a customer ID 215, and set Customer Active 216 and Customer Type 217;
  b) recording client details 221;
  c) selecting a region to assign to the customer;
  d) adding a record in the second table 230 using customer ID 215 and setting System ID 236 and the first allocated identifier 237;
  e) adding a record in the third table 240 using customer ID 215 and System ID 236 and setting the last allocated identifier 247 and time stamp 248;

If a customer is allocated an additional tranche of identifiers that are contiguous (or serially-sequential) from a tranche of identifiers previously allocated to the client, then only a new record to the third table 240 is added.

In this example, each record in the second table 230 will occupy 28 bytes and each record in the third table 240 will occupy 36 bytes. For one million registered customer-systems the second table 230 would occupy 28 Megabytes and third table 240 would occupy 36 Megabytes, occupying a total of 64 Megabytes in storage. It will be appreciated that the first table 210 and the customer table 220 providing customer details would also require further storage capacity.

In this example, if each customer had an average of 10 systems, then the second table 230 would occupy 280 Megabytes and third table 240 would occupy 360 Megabytes, occupying a total of 640 Megabytes in storage. Further, if each custom-system were to be allocated 100 sets of numbers during its life, third table 240 would occupy 6.4 Gigabytes. These records fit easily within current storage systems (for example a USB memory stick or low power hand-held portable data capture unit).

This data structure (database) simplifies administration of the registry and identification of allocated numbers. Other systems may need to record every number allocated to every customer-system. As identifiers are allocated sequentially, this data structure only requires a record of the limiting identifiers issued to the client and the date and time the issue was made.

This registry and allocation method can also indicate if the identifiers belong to an open or closed system. A customer can be allocated a new Customer ID for each type of system identifiers that are to be allocated. A continuous tranche of numbers is allocated for each system belonging to each customer. The characteristics of each system are described in another table within the database. Characteristics can include whether the system is open or closed, an associated URL or associated permanent IP address (for example an IP address that a reader can connect to for obtaining additional information regarding the identifier.

Figure 2B:
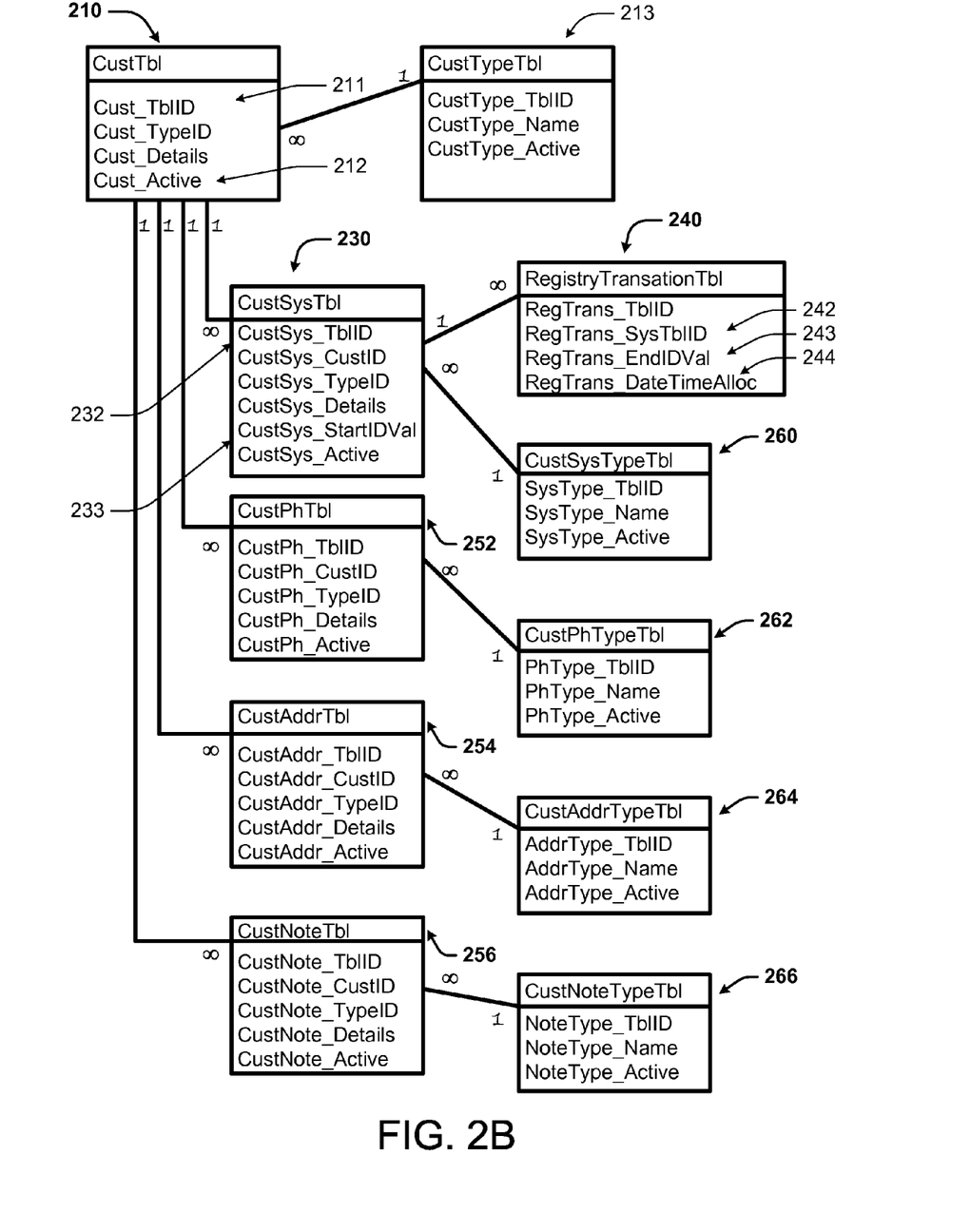
FIG. 2B is a schematic representation of a database structure for managing unique identifiers.

Referring to FIG. 2B, an alternative example database can maintain the register using a plurality of relational tables, as described below.

A Customer Table (CustTbl) 210 includes:
  (1) a customer table identifier (Cust_TblID) 211;
  (2) a customer type identifier (Cust_TypeID);
  (3) a customer details (Cust_Details);
  (4) a customer active indicator (Cust_Active) 212;

In this example embodiment the Customer Table entry links to an entry of a Customer Type Table (CustTypeTbl) 213 which includes:
  a customer type table identifier (CustType_TblID);
  a customer type name (CustType_Name);
  a customer type active indicator (CustType_Active).

In this example embodiment the Customer Table entry further links to one or more entries of each of a Customer System Table, a Customer Phone Table, a Customer Address Table, and a Customer Note Table.

The Customer System Table (CustSysTbl) 230 includes:
  (1) a customer system table identifier (CustSys_TblID) 232;
  (2) a customer system customer identifier (CustSys_CustID);
  (3) a customer system type identifier (CustSys_TypeID);
  (4) a customer system details (CustSys_Details);
  (5) a customer system start identifier value (CustSys_StartIDVal) 233;
  (6) a customer system active indicator (CustSys_Active);
and which entries are associated with a Customer System Type Table (CustSysTypeTbl) 260 which includes:
  a system type table identifier (SysType_TblID);
  a system type name (SysType_Name);
  a system type active indicator (SysType_Active).

The Customer Phone Table (CustPhTbl) 252 includes:
  (1) a customer phone table identifier (CustPh_TblID);
  (2) a customer phone customer identifier (CustPh_CustID);
  (3) a customer phone type identifier (CustPh_TypeID);
  (4) a customer phone details (CustPh_Details);
  (5) a customer phone active indicator (CustPh_Active);
and which entries are associated with a Customer Phone Type Table (CustPhTypeTbl) 262 which includes:
  a phone type table identifier (PhType_TblID);
  a phone type name (PhType_Name);
  a phone type active indicator (PhType_Active).

The Customer Address Table (CustAddrTbl) 254 includes:
  (1) a customer address table identifier (CustAddr_TblID);
  (2) a customer address customer identifier (CustAddr_CustID);
  (3) a customer address type identifier (CustAddr_TypeID);
  (4) a customer address details (CustAddr_Details);
  (5) a customer address active indicator (CustAddr_Active);
and which entries are associated with a Customer Address Type Table (CustAddrTypeTbl) 264 which includes:
  an address type table identifier (AddrType_TblID);
  an address type name (AddrType_Name);
  an address type active indicator (AddrType_Active).

The Customer Note Table (CustNoteTbl) 256 includes:
  (1) a customer note table identifier (CustNote_TblID);
  (2) a customer note customer identifier (CustNote_CustID);
  (3) a customer note type identifier (CustNote_TypeID);
  (4) a customer note details (CustNote_Details);
  (5) a customer note active indicator (CustNote_Active);
and which entries are associated with a Customer Note Type Table (CustNoteTypeTbl) 266 which includes:

a note type table identifier (NoteType_TblID);
a note type name (NoteType_Name);
a note type active indicator (NoteType_Active).

In this example embodiment the Customer Table entry links to one or more entries of a Registry Transaction Table (RegistryTransactionTbl) 240 which includes:
a registry transaction table identifier (RegTrans_TblID);
a registry transaction system table identifier (RegTrans_SysTblID) 242;
a registry transaction end identifier value (RegTrans_EndIDVal) 243;
a registry transaction time date allocate indicator (RegTrans_DateTimeAlloc) 244.

Figure 3:
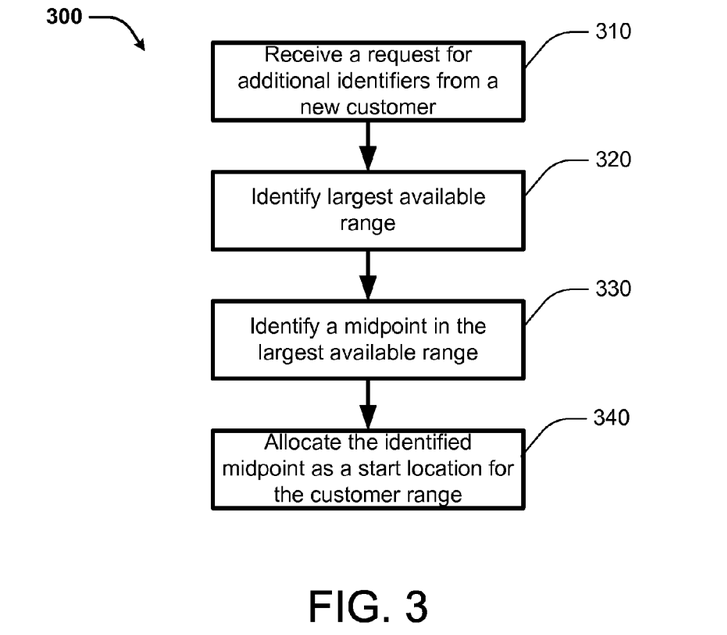
FIG. 3 is a flowchart of a method for allocating a unique identifier from a register to a new customer-system.

Referring to FIG. 3, an example method 300 for allocating a first range of identifiers to a customer involves the steps of:
a) Step 310, receiving a request for additional identifiers from a new customer-system;
b) Step 320, identifying the largest available range;
c) Step 330, identifying the midpoint in the largest available range; and
d) Step 340, allocating the identified midpoint as the start location for the customer-system's range.

Figure 4:
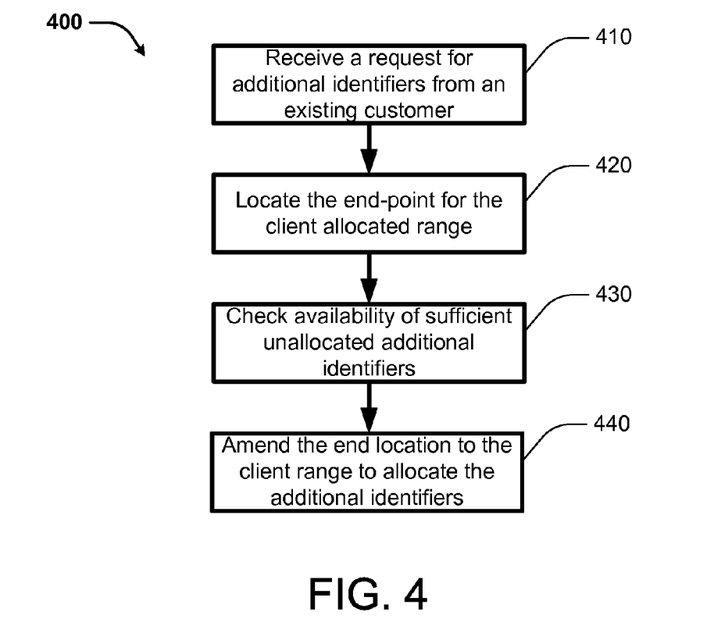
FIG. 4 is a flowchart of a method for allocating a unique identifier from a register to an existing customer-system.

Referring to FIG. 4, an example method 400 for allocating an additional range of identifiers to a customer-system involves the steps of:
a) Step 410, receiving a request for additional identifiers from an existing customer-system;
b) Step 420, locating the end-point for that customer-system's previously allocated range;
c) Step 430, checking availability of sufficient unallocated additional identifiers that are contiguous (or serially-sequential) to the located customer-systems previously allocated range; and
d) Step 440, amending the end location to the client range to allocate the additional identifiers.

Figure 5A:
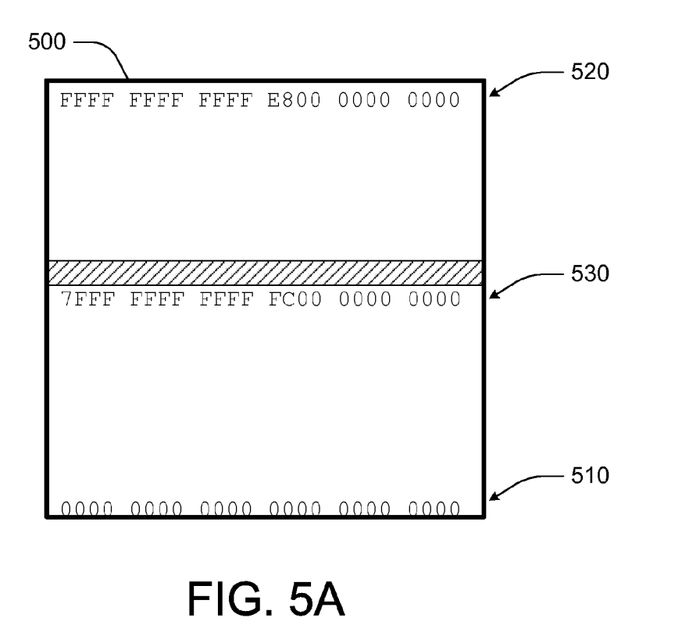
FIG. 5A is a schematic representation of a register structure, showing allocated unique identifiers.
Figure 5B:
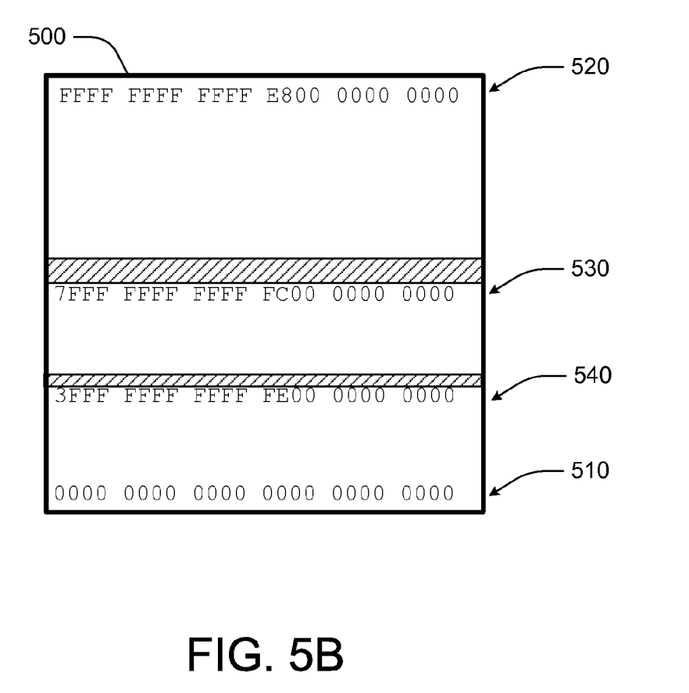
FIG. 5B is a schematic representation of a register structure, showing allocated unique identifiers.
Figure 5C:
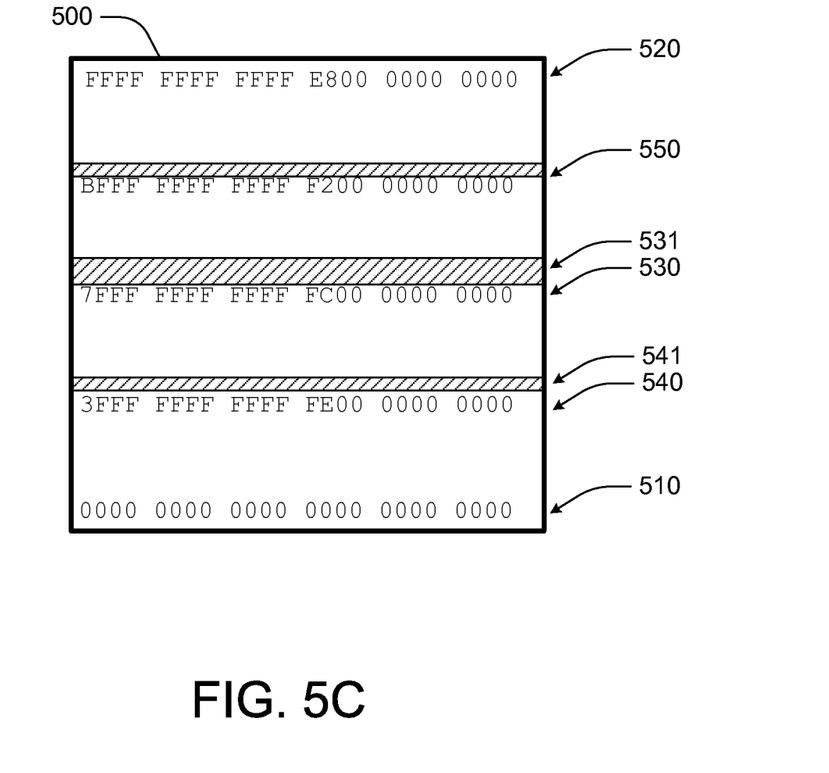
FIG. 5C is a schematic representation of a register structure, showing allocated unique identifiers.

FIG. 5A, FIG. 5B and FIG. 5C shows an example registry 500, identifying allocation of identifiers to customers according to the above method. This example involves 96 bit identifiers ranging between 0 and $2^{96}$, identified as 510 and 520 respectively. A "domain space distance" is defined as the quantity of unallocated/available numbers, between two points in the "domain". The allocation may go from the middle upwards or from the middle downwards, but the one convention should be adhered to, except in the remote circumstance where there are insufficient numbers in that direction to maintain a contiguous set, for the life of this registry.

FIG. 5A depicts the allocation of the first tranche of numbers 230 from the registry, which is the middle of the largest space of free identifiers. In this example, the first allocation to a customer commences at $2^{95}$, mid-point between 0 and $2^{96}$. The allocation assigned identifiers that increase from $2^{95}$.

FIG. 5B depicts the allocation of the second tranche of numbers 240 from the registry, which is also the middle of the largest space of free identifiers. Based on the principle of bisecting the largest "domain space distance" of available numbers, the next allocation is to this space is between 0 and $2^{95}$.

FIG. 5B depicts the allocation of the second tranche of numbers 250 from the registry, which is also the middle of the largest space of free identifiers. Once the second tranche allocation is applied, and subject to the size of the first allocated tranche, the largest available domain space distance is from the end of the first allocated tranche to the top of the domain. In this example, the third allocation will be about BFFF FFFF FFFF F2 0 0 0 0 0 0 0 0 0 0, and subject to the size of the first allocated tranche.

This process is then repeated for each new customer-system, in which a new allocation is made halfway within the largest domain space available at that time.

Additional identifiers can also be allocated to an existing customer-system. In the above example, if the customer allocated the second tranche requests additional identifiers for the associated customer-system, the allocation is provided from the last allocation. It will be appreciated that because the distances between each allocation are initially selected as the maximum available, the chances of a collision with another client-system is substantially reduced.

Encryption can be applied to identifiers provided from a registry system, preferably using a commonly available and well proven encryption technique. Customers can be supplied with the encrypted version of an identifier for use with a mark (for example a 2D Barcode or any other system of AutoID) and the decrypted identifier for use within computer systems. Provided the system of encryption remains unbroken, this arrangement prevents the construction of counterfeit identifiers or compatible identifiers, and also limits competitors from establishing compatible registries.

It will be appreciated that embodiments of the registry method and apparatus provides one or more of the following features:
a customer-system is allocated a contiguous run of numbers, benefiting administration of each system;
allocation enables improved utilisation of the registry;
numbers within a 96 bit domain are significantly large—for example, if a thousand billion numbers were issued a year, the registry would not be exhausted for billions of years;
the chances of an allocation attempt for one customer-system colliding with another is remote;
in the event of a allocation attempt for one customer-system colliding with another, the customer-system would be allocated another ID and a new allocation would be established in the middle of the largest unallocated domain space;
administering the register required keeping track of customers, their systems, the limits of the allocation provided to each customer-system and the date/time of that allocation;
administration of the register enables establishing portable (or distributed) databases on hand-held systems;
a separate database can store and manage additional features (for example, indicating if a system is open or closed, or the URL or URLs a reader should interrogate for information), the size of which is likely to small enough to be stored on a hand-held reader.
flexibility is provided to accommodate any changes as they arise.
encryption can be utilised to prevent the creation of counterfeit new identifiers, and limit competitors issuing compatible identifiers from imitation databases.

An embodiment provides a registry of identifiers/numbers, with a method of allocation including the steps:
a) commencing allocating identifiers from the centre (or some point approximating the centre) of the largest domain space of unallocated/available identifiers/numbers,
b) allocating identifiers on the basis of a unique need (for example in the case of the above example a "customer-system"), and
c) subsequent allocation of additional identifiers to a range assigned for an existing "customer-system", that allocation commences from the point of the last identifier (plus 1) of the previously allocated range assigned to an existing "customer-system" and d) providing an Encrypted identifier to the customer.

An embodiment of a registry is of practical utility as an advanced AutoID system. The use of this registry can allow the sale of unique identifiers, having considerable commercial value.

The registry enables development of systems that can individually identify (or be used to label) every object of commercial and financial significance. A labelling method and system can include a "LARGE NUMBER ID TAGGING SYSTEM" disclosed in Patent Co-operation Treaty application No. PCT/AU2008/000613, which is herein incorporated by reference.

Figure 6:
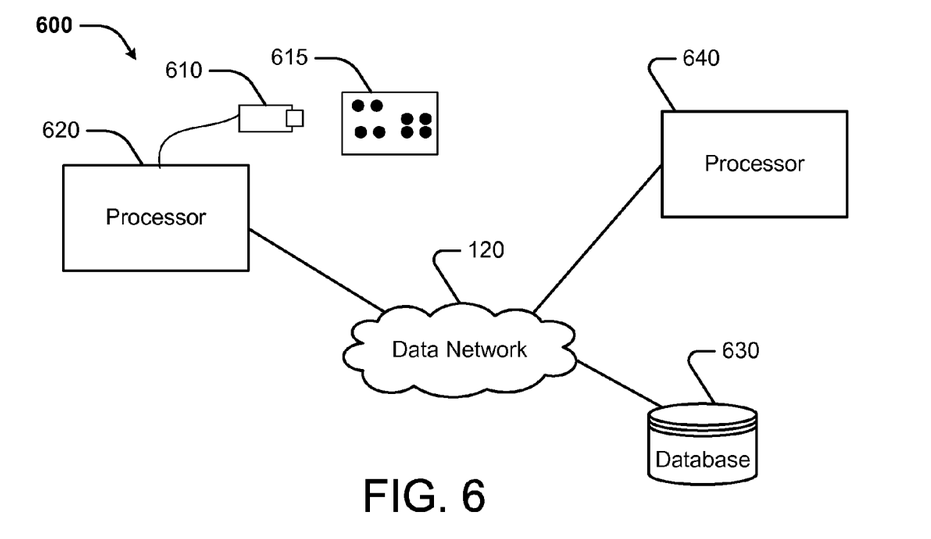
FIG. 6 is a schematic representation of an apparatus for decoding a unique identifier.

FIG. 6 shows, by way of example, a schematic representation of an apparatus 600 for decoding a unique identifier. The apparatus includes an input device 610 adapted to receive data indicative of a mark 615 (comprising a unique identifier). A processor is adapted to receive and decode (and if appropriate authenticate and decrypt) the data to provide an associated unique identifier. The processor 620 can interrogate a database 630 to receive relevant information. In this example the processor 620 is coupled to the database 630 via a data network 120. Alternatively the unique identifier can be transmitted to another processor 640, which can interrogate the database for associated stored information.

Figure 7:
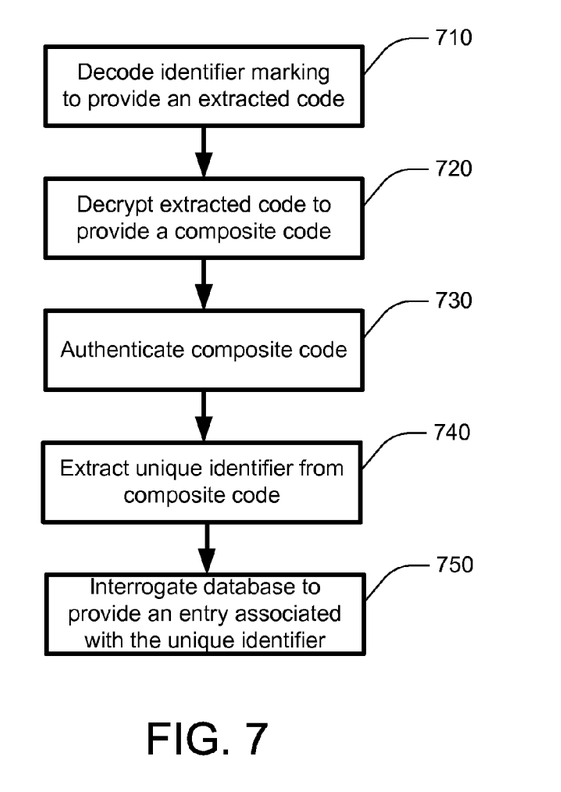
FIG. 7 is a flowchart of a method for decoding a unique identifier.

FIG. 7 shows, by way of example, a flowchart of a method for decoding a unique identifier. The method comprises:
a) step 710, receiving and decoding an identifier marking to provide an extracted code;
b) step 720, decrypting the extracted code to provide a composite code;
c) step 730, authenticating the composite code;
d) step 740, extracting a unique identifier from the composite code; and
e) step 750, interrogating a database to provide an entry associated with the unique identifier.

In an embodiment, the decoding and decryption process consists of a cascade of the following functions: decoding function, and decryption function.

By way of example, the decoding function receives quality factors (Qr, Qs and Qe) and combines them by multiplication. If the result is lower than some threshold, the decoder can reject the image as being too damaged to decode. If the overall quality factor is above the threshold, the decoder takes a 20×10 image and interprets it as a 19×9 1-bit array, surrounded by horizontal and vertical check bits. If any of the horizontal and vertical check bits are in-correct, the decoder rejects the image. If all check bits are correct, the first 170 bits of the 19×9 1-bit array are passed to the decryption Function.

By way of example, the decryption function comprises receiving a 170 bit extracted code from a decoding function and decrypting the extracted code with a decryption function to yield a 170 bit composite code. The composite code consists of a 128 bit tag code concatenated with a 42 bit check code. If the check code does not correspond to that of the 128 bit tag code, then the tag is deemed to be non-genuine, and the tag code is invalid. If the check code is correct, then the 128 bit tag code is transmitted. It will be appreciated that the decryption can be applied by firmware as a process interposed between a reader utilising another form of barcode or RFID technology and still use numbers issued from the central registry. It will be further appreciate that using a 42-bit check code provides a probability of a randomly generated (damaged) tag code being found to be valid is in the order 1 in 4 trillion.

By way of example only, a unique registry may be used by all commercial and financial entities throughout the world, including consumers of these products and services. In this example:

an identifier/number domain runs from 0 to $2^{96}$.

the owner of a number domain provides enabling technology for using these numbers in a labelling method and system (for example AutoID), preferably it comprises:
(i) a 2D barcode system (similar to, for example, DataMatrix, Aztec Code, QRCodes or PDF417), wherein the 2D barcode can preferably be read in any orientation without utilising fiducial marks;
(ii) firmware/software for identifying/reading the 2D barcode, along with technical details for enabling manufacturers to provide and develop this firmware;
(iii) printing/laser-etching systems for enabling low cost marking of items and/or their packaging (on a production line or during a supply chain) with a 2D barcode.
(iv) encryption of numbers, such that production of new (or counterfeit) numbers by anyone other than the owner will be restricted.

an owner of a number domain can allocate blocks of numbers to registrars, for example to $2^{20}$ (1,048,576) registrars.

registrars would have $2^{76}$ (75,557,863,725,914,323,419, 136 or approximately 75,000 billion, billion) numbers to on-sell.
(i) If a registrar allocated 1,000 billion numbers per year to its customers, it would not exhaust its allocation for 75.5 billion years.
(ii) If a registrar sold numbers for 0.001 cents each, an income for allocating 1,000 billion numbers is $10,000,000.00.

a registrar may preferably sell numbers to clients, with registrars setting a price per number. A registrar may, for example, pay $1,000,000 to be an authorised vendor of a tranche of $2^{76}$ numbers from a central registry. Therefore value of the central registry can be calculated as $2^{20} \times \$1,000,000$ or $1,048,576,000,000 (or approximately 1,000 billion dollars).

In an embodiment, by way of example only, global unique identifiers/numbers can be allocated from a registry. Encryption of issued numbers restricts counterfeit/imitation within competing registries. The system for identifying a mark indicative of an identifier can include:

firmware and/or software for enabling the reading of a 2D barcode;

firmware and/or software (including Open Source Software) for enabling, encryption of identifiers/numbers, such that generating valid identifiers/numbers is substantially restricted;

firmware and/or software for enabling the identifier/number, read by a reader, to be decrypted and/or validated as genuine.

In an embodiment, a computer architecture facilitates the allocation of unique identifiers from the registry. The architecture performs a practical purpose providing an interface to customers. A global registry of unique numbers derived from the need for a universal means of identifying articles. Being a single registry (that may be distributed), companies and individuals can share information about articles in which they have a common interest. It would be appreciated that, a registry requires to be suitably large, otherwise to maintain availability to unique numbers.

When providing a registry, it is preferable that a numbering convention is used to enable, upon reading the number and without recourse to a large database, an indication to be obtained as to the purpose or nature of the number. This typically requires segmentation of a number domain into a hierarchy (or groups) of related entities. A typical problem with this approach is that segmentation can 'waste' identifiers. Identifiers/numbers (or groups) are permanently allocated to a specific purpose. The following provides an example of a segmented system of allocating identifiers numbers.

By way of example only, the following is illustrative of a segmentation approach that has been used by some competing number registry systems, such as GS1, and which are sub-optimal when compared to the puristic approach taken by the present registry algorithm:

One or more bits of an identifier's 96 bits can be allocated to indicating (for example to a reader) whether an identifier/number belongs to an "Open" or "Closed" system. It will be appreciated that such a convention will permanently occupy $2^{95}$ identifiers/numbers as belonging to a "Closed" system and $2^{95}$ identifiers/numbers as belonging to an "Open" system. It will be further appreciated that during the life of the registry, if the number of identifiers allocated to an "Open" systems does not equal the number of identifiers allocated to a "Closed" systems, one or the other system will be less utilised.

To limit tag-readers from requiring access to a huge database of numbers to determine an appropriate method of interpreting/processing an identifier/number, a universal convention for applying identifiers can be employed where information about the character of the identifier can be directly implied by the tag reader from reading the mark or decoding the identity). This can be achieved by having predetermined bits associated with an identifier allocated an indication of "handling instruction".

Considerations for a handling instruction can include:
if an identifier/number belongs to a Closed System, the Tags will be read by readers having purpose designed software, and data indicative of a process for interpreting a read identifier. Handling instructions therefore become the responsibility of individual owners/designers of the system. It will be appreciated that an agreed standard across industries is unlikely.
if an identifier/number belongs to an Open System, an agreed convention can be imposed. For example, an IP address of a server, to enable a reader to interrogate for information on processing an identifier, can be embedded in the identifier/number or applied mark. It will be appreciated that embedding an IP address requires allocation of 32 bits, which in the above arrangement using an identifier having 95 bits, would enable further segmentation of 63 bits.

By way of example only, if an "Open" system applied a handling instruction requiring 32 bits, the range of identifiers available to an "Open" system registry would be approximately four billion times smaller than would be available to a "Closed" system registry. However, it will be appreciated that $2^{63}$ represents a very large number (being 9,223,372,036,854,775,808).

Data indicative of application type may also be encoded (or embedded) into an identifier. The term "Application Type" can refer to the manner in which the identifier/number system can be applied. Examples of applications to which this numbering system might be applied include:
(i) a stores inventory application;
(ii) a transportation, movement and/or control applications;
(iii) a financial accounting documentation applications;
(iv) a retail "generic" products point of sale application; and
(v) a warehouse/storage applications.

Continuing with the above example, the remaining 63 bits can be further segmented to indicate a type of application. The number of bits allocated will define the maximum number of identifiable applications. For example, allocating 16 bits would allow the segmentation of the identifiers into 65,536 applications, whereas allocating 8 bits would allow the segmentation of the identifiers into 256 applications. It will be appreciated that allocating an appropriate number of bits is difficult without a priori information. If the number chosen is later found to be inadequate, it is difficult (or impossible) to rearrange the registry. For this example, 8 bits are allocated to identify an appropriate application type, leaving 55 bits for the further segmentation.

Identification of the customer from an identifier/number is also beneficial. The identifier-customer (or registered owner) can be the entity that has paid for a range of identifiers to which a particular identifier belongs. For example a million identifiable customers may exist. If 24 bits were to be allocated to identify a registered owner, this would provide for the identification of 16,777,216 individual registered owners. This would leave 31 bits for further allocation (or segmentation).

This remaining 31 bits provides 2,147,483,648 unique identifiers for any given application and registered owner. Although this is a large number, it may not be inexhaustible during the life of a business. For example, how many individual pieces of food has McDonalds sold since it first opened its doors? In this example, it will be appreciated that a predefined segmentation of the identifiers or numbers can be undesirable or impractical. "Pre-allocation" of bits for each conceived purposes is typically not practical. By way of example only no only is there potentially largescale underutilisation (or waste) of the available numbers in the registry, but there is the risk of running out of unique numbers during the life of some systems. Typically, once the registry has been divided up in this manner, it is not possible to later revise the system of allocation so as to gain a better utilisation of the potential numbers in the registry.

Problems associated with Pre-allocation" of bits and the associated segmentation of a range of identifiers/numbers include:
segmentation may include too few bits, and therefore not provide sufficient range of identifiers for the life of the system.
segmentation may include too many bits, and therefore provide insufficiently utilisation of a range of identifiers for the life of the system.
other segment types may be identified after implementation.

Conventional segmentation of a register of identifiers/numbers, can include:
providing each item with two marks (or barcodes). One mark/barcode is indicative of the segmentation, the other mark/barcode is indicative of a unique identifier. If the segmentation mark is not present, the reader can revert back to the central registry to obtain information otherwise provided by a segmentation mark.
providing an extensible method of segmentation, wherein the number's structure, informs a reader as to the presence of a segmentation method. For example, "leading" bits can be indicative of predetermined bits being used for a particular purpose. This imposes an overhead on the system, but can be used to improve utilisation of a register.

By way of a further example, a Media Access Control (MAC) address is defined by a unique 48 bit number provided from a central registry. The purpose of the MAC address is for unique identification of each Network Interface (typically Network Interface Cards—NIC—in computers). Each Ethernet Interface Card has a unique 48 bit MAC address, allocated by the following system:

(i) the first 24 bits describing the manufacturer of the Ethernet card (owner); and (ii) the last 24 bits being serially allocated (consumer).

This allocation method allows one customer to apply 16,777,216 MAC addresses to network interfaces before running out of unique serial numbers, at which time the manufacturer is allocated another Manufacturer's ID.

In the case of a global registry of unique numbers, the number of customers for ranges of numbers cannot be accurately predicted. Proposing to divide a register comprising a number range represented by 96 bits in half, ie, 48 bits (a range of 281,474,976,710,656) for the purposes of allocating an owner identification and 48 bits for the serial number may not be prudent. In this system, each registered owner on the registry would be initially allocated $2^{48}$ (i.e. 281,474,976, 710,656) identifiers, which are associated (or "locked-up") with this customer (or registered owner). It will be appreciated that it is may not be an economical use of numbers that do not adequately utilise their allocated range.

Alternatively, if a larger number of bits were allocated to identifying a customer, the customer may exhaust the allocated range of identifiers and require a new customer number. Utilisation may be improved by allocating fewer bits to each customer (for example 16 bits), however customers requiring allocation of additional identifiers will be issued with multiple customer/owner identifiers.

It will be appreciated that the method and apparatus for allocating a unique identifier from a register can be used in combination with a labelling method and system (including a "LARGE NUMBER ID TAGGING SYSTEM").

It will be further appreciated that the disclosed method and apparatus for allocating unique identifier from a register can enable or provide one or more the following features, including:

a database (or specifically three tables) can be used to record the customer details and identify the presently allocated start and finish reference integers;

allocation of reference integers to all registered customers are managed centrally;

additional reference integers can be dynamically allocated to an existing customer, preferably such that they are sequential to previously allocated;

a balance is achieved between the number of registered customers (or customer-system) and the maximum range allocated to any one customer (or customer-system);

a range of unique identifiers available to a customer is related to the number registered, i.e. the maximum sequential range potentially available to a customer decreases as new customers are added and ranges of identifiers allocated;

error detection/correction can be applied to the reference integer;

authentication coding can be applied to reference integers prior to encryption;

an identifier can be provided in an encrypted and a clear format;

error correcting/detecting codes may be applied before or after encryption;

asymmetric encryption can be used such that customers can be aware of the decryption key, but are not aware of the encryption key; and a multi-key encryption method (similar to that used in HDMI) can enable deactivation of compromised keys.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Similarly, it is to be noticed that the term coupled, when used, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "unit" or "device" or "module" shall also be taken to include any collection of same that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of whatever the device is. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those in the art.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practised in the absence of any element which is not specifically disclosed herein.

The claims defining the invention are as follows:

1. A method implemented on a computing apparatus for allocating a first range of unique identifiers to a customer-system from a register maintained by the computing apparatus, the register defining an entire range of unique identifiers, the method comprising the steps of:
   (a) receiving a request for a first number of identifiers from a new customer-system;
   (b) identifying a largest continuous range of unallocated unique identifiers to define an available range within the entire range of unique identifiers belonging to the register;
   (c) identifying a midpoint in the largest available range;
   (d) using the identified midpoint to determine a first continuous range of unique identifiers comprising the first number of requested identifiers, wherein the identified midpoint is a start location or an end location of the continuous range of identifiers; and
   (e) allocating the first continuous range of unique identifiers as the first range of unique identifiers to the customer-system, wherein data indicative of the allocated first range of unique identifiers is transmitted to the customer-system.

2. A method according to claim 1, wherein identifiers in the allocated range of unique identifiers are each encrypted, and identifier pairs comprising the allocated identifier and corresponding encrypted identifier are transmitted to the customer-system.

3. A method according to claim 1, wherein a second range of unique identifiers, allocated to a subsequent second new customer-system upon request, is selected from substantially the midpoint of available identifiers defining a largest domain space distance within the entire range of unique identifiers belonging to the register.

4. A method according to claim 3, wherein the allocated range of unique identifiers is selected from available identifiers defining a largest domain space distance.

5. A method according to claim 4, wherein the domain space distance is defined as being the magnitude of the quantity of individual identifiers between:

the beginning of the entire range of identifiers to the beginning of the first allocation of identifiers to a previous customer-system; or the end of a previous customer-system allocation to the beginning of another previous customer-system; or the end of a previous customer-system allocation to the end of the entire range of available identifiers.

6. A method according to claim 3, wherein a third range of unique identifiers is allocated to the customer-system, the customer-system being previously allocated identifiers from the register, the method comprising of the steps of:
(f) receiving a request for an additional number of identifiers from an existing customer-system;
(g) locating the end-point for that client's previously allocated customer-system range;
(h) checking availability of sufficient unallocated additional unique identifiers that are contiguous from the located end-point of the client's previously allocated customer-system range; and
(i) adding a record to a relevant database for maintaining a register of unique identifiers allocated to the customer-system.

7. A method according to claim 1, wherein a database comprises one or more tables for maintaining a register of each allocated range of unique identifiers.

8. A method according to claim 7, wherein the database is configured to maintain a register of each allocated range, the register including: data indicative of a customer-system ID, a date-time of issue, a start identifier and a end identifier.

9. A method according to claim 8, wherein the customer-system allocated a range of unique identifiers becomes a registered owner of that range of unique identifiers.

10. A method according to claim 9, wherein each identifier in an allocated range is provided to the respective customer-system in both a clear text and an encrypted data format.

11. A method according to claim 10, wherein each identifier is represented by a 128 bit number, wherein 96 bits are available for unique identification.

12. A non-transient computer-readable storage medium storing a set of instructions that when executed by one or more processors cause the one or more processors to carry out a method according claim 1 to allocate a range of unique identifiers to a customer-system.

13. An apparatus for managing unique identifiers, the apparatus being coupleable to a database that comprises one or more tables for maintaining a register of each allocated range, the apparatus comprising:
a processor device being adapted to interrogate the database to receive relevant information for allocating a range of unique identifiers from the registry; a processor device being adapted carry out a method according to claim 1.

14. An apparatus according to claim 13, wherein a customer manages one or more customer-systems that utilise an allocation of identifiers.

15. A method implemented on a computing apparatus for allocating a first range of unique identifiers to a customer-system from a register maintained by the computing apparatus, the register having at least $2^{32}$ unique identifiers defining an entire range of unique identifiers, the method comprising the steps of:
(a) receiving a request for a first number of identifiers from a new customer-system;
(b) identifying a largest continuous range of unallocated unique identifiers to define an available range within the entire range of unique identifiers belonging to the register;
(c) identifying a midpoint in the largest available range;
(d) using the identified midpoint to determine a first continuous range of unique identifiers halfway within the largest available range and comprising the first number of requested identifiers, wherein the identified midpoint is a start location or an end location of the continuous range of unique identifiers; and
(e) allocating the first continuous range of unique identifiers as the first range of unique identifiers to the customer-system, wherein data indicative of the allocated first range of unique identifiers is transmitted to the customer-system.

16. A method implemented on a computing apparatus for allocating a first range of unique identifiers to a customer-system from a register maintained by the computing apparatus, the register having at least $2^{32}$ unique identifiers defining an entire range of unique identifiers, the method comprising the steps of:
(a) receiving a request for a first number of identifiers from a new customer-system;
(b) identifying a largest continuous range of unallocated unique identifiers to define an available range within the entire range of unique identifiers belonging to the register;
(c) identifying a midpoint in the largest available range;
(d) using the identified midpoint to determine a first continuous range of unique identifiers located halfway within the largest available range and comprising the first number of requested identifiers; and
(e) allocating the continuous range of unique identifiers as the first range of unique identifiers to the customer-system, wherein data indicative of the allocated first range of unique identifiers is transmitted to the customer system.

* * * * *

UNITED STATES PATENT AND TRADEMARK OFFICE
CERTIFICATE OF CORRECTION

PATENT NO. : 8,886,684 B2
APPLICATION NO. : 13/383839
DATED : November 11, 2014
INVENTOR(S) : Kevin Loughrey It is certified that error appears in the above-identified patent and that said Letters Patent is hereby corrected as shown below:

On the Title Page Item (73) should read: dPid Pty Ltd

Signed and Sealed this
Twenty-fourth Day of February, 2015

Michelle K. Lee
*Deputy Director of the United States Patent and Trademark Office*